F. A. BRIGGS.
DEVICE FOR REPAIRING FENDERS OF AUTOMOBILES.
APPLICATION FILED SEPT. 2, 1919.

1,348,625.

Patented Aug. 3, 1920.

Frank A. Briggs
Inventor

By his Attorney
Frank Warren

UNITED STATES PATENT OFFICE.

FRANK A. BRIGGS, OF BELLINGHAM, WASHINGTON.

DEVICE FOR REPAIRING FENDERS OF AUTOMOBILES.

1,348,625.  Specification of Letters Patent.  Patented Aug. 3, 1920.

Application filed September 2, 1919. Serial No. 321,256.

*To all whom it may concern:*

Be it known that I, FRANK A. BRIGGS, a citizen of the United States, residing at Bellingham, in the county of Whatcom and State of Washington, have invented a certain new and useful Improvement in Devices for Repairing Fenders of Automobiles, of which the following is a specification.

My invention relates to improvements in devices for repairing fenders of automobiles and the object of my invention is to provide a simple, cheap and efficient fender repairing device as an article of manufacture that may be carried in cars or kept in garages and that may be quickly and easily applied to cracked and broken fenders.

A further and more specific object is to provide a fender repairing device that is strong in construction and one that is almost entirely hidden by the fender which it serves to repair.

My invention consists in the novel construction, adaptation and combination of parts of a fender repairing device as will be more clearly hereinafter described and claimed.

Figure 1:
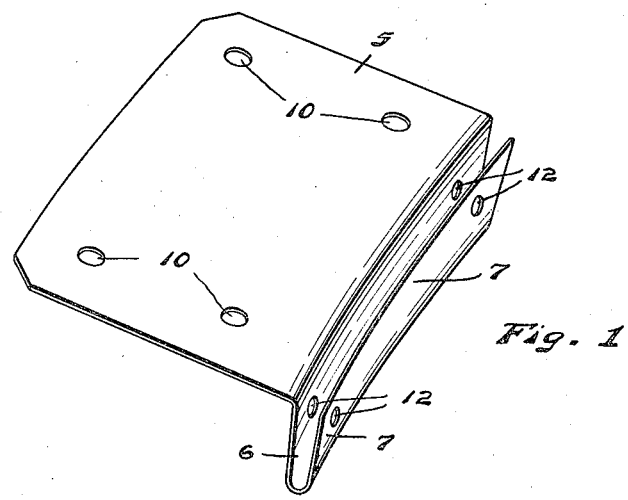
Figure 2:
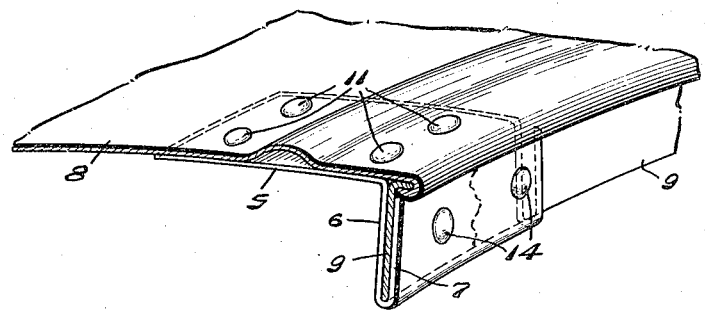

I accomplish these objects by devices illustrated in the accompanying drawings wherein, Figure 1 is a view in perspective of a fender repairing device constructed in accordance with my invention, and Fig. 2 is a fragmentary view in perspective of a fender showing my fender repairing device applied thereto, parts of the fender being shown in cross-section.

Referring to the drawings throughout which like reference numerals indicate like parts, I have shown a fender repairing device that is constructed of a single piece of sheet metal and comprises a plate or body portion 5 that is curved slightly to fit the curvature of the fender and that has a relatively narrow deep channel formed on one edge thereof by bending the plate downwardly to form an inner flange 6 and thence upwardly to form an outer flange 7, the channel portion having the same curvature as the body portion 5 so that it will fit a curved fender.

In Fig. 2 I have shown my device as it may appear when applied to fender 8 that is provided near its outer edge with a flange 9 that is arranged at right angles to the main body of the fender and projects downwardly therefrom in a well known manner.

The body portion 5 of the repairing device is provided with holes 10 for the reception of bolts or rivets 11 by which the device may be secured to the main portion 8 of the fender and the flange portions 6 and 7 are provided with similar holes 12 that register with each other and through which bolts or rivets 14 may be passed for securing such flange portions 6 and 7 to the flange 9 of the fender.

In applying the device to a fender the plate 5 is placed beneath the fender and the channel portion is placed over the flange 9 in such a position that the break in the fender is about mid way between the two sides of the device.

The location of the holes are then marked on the fender, the holes are punched or drilled and the rivets or bolts are inserted and tightened, thus securing the repairing device rigidly to the fender and forming a substantial and inconspicuous patch.

In practice it has been found satisfactory to provide four holes in the body member 5 and two holes in each of the flanges 6 and 7, the holes being arranged substantially as shown, it being well understood, however, that the number and arrangement of the holes may be varied if desired.

My device may be applied to a fender in which both the fender body 8 and the flange 9 are cracked or broken or it may be applied to a fender in which only the fender body is broken or only the flange is broken.

It often happens that the flange 9 of a fender will become cracked or broken before the body portion is cracked or broken at a corresponding point. If the fender is repaired by the use of one of these devices when a crack or break first occurs in the flange 9 it will prevent the occurrence of a crack or break at the same location in the body portion 8.

From the above description it will be seen that my fender repairing device is light and strong and may be quickly and easily applied to a broken fender, the work of applying the same requires little skill and not necessitating the use of any tools except a hammer and a drill or punch.

Obviously changes may be made in the forms, dimensions and arrangement of parts of my invention without departing from the spirit thereof.

What I claim is:

As an article of manufacture, a fender repairing device comprising a plate that is curved to fit the lower side of a fender and provided with perforations for the reception of securing means, and a relatively deep narrow internal channel formed on one edge of said plate and arranged to fit over the flange of a fender, said channel having perforations to permit the passage of securing means.

In witness whereof, I hereunto subscribe my name this 19th day of August A. D. 1919.

FRANK A. BRIGGS.